Patented Aug. 18, 1942

2,293,463

UNITED STATES PATENT OFFICE 2,293,463

BENZAL OCTYL CYANOACETATE

Ingenuin Hechenbleikner, Stamford, Conn., assignor to American Cyanamid Company, New York, N. Y., a corporation of Maine No Drawing. Application August 30, 1941, Serial No. 409,119

1 Claim. (Cl. 260—465)

The present invention relates to benzal octyl cyanoacetate, a new compound which is of particular interest as an intermediate in the preparation of the corresponding amine, amide and acid, as a plasticizer for synthetic resins, and as an insecticidal agent. It is highly effective in controlling soft-bodied insects which are particularly difficult to exterminate, for example the citrus red spider, *Tetranychus citri*.

The following example, in which the parts are by weight, illustrates a specific method of preparing the above compound in accordance with the invention.

Example 20 parts of benzaldehyde were gradually added to 40 parts of octyl cyanoacetate, cooled to 0° C. 2 parts of piperidine (catalyst) were added and the mixture then allowed to stand for 12 hours in a closed vessel at approximately 5° C. Considerable water had separated at the end of this period. The mixture was allowed to stand at room temperature (20° C.) for an additional 12 hours. The oily reaction product was dissolved in ether, washed neutral (0.05% $H_2SO_4$), dried over sodium sulphate and distilled at reduced pressure. The benzal octyl cyanoacetate was recovered as a colorless oil distilling at 150° C. at 1 mm. It solidified on cooling to room temperature.

Although this new compound is especially effective as a contact poison for the control of insect pests, it may also be used for fungicidal and bactericidal purposes.

While the invention has been described with particular reference to specific embodiments, it is to be understood that it is not to be limited thereto but is to be construed broadly and restricted solely by the scope of the appended claim.

I claim:

Benzal octyl cyanoacetate.

INGENUIN HECHENBLEIKNER.